US012051427B2

(12) United States Patent
Mahe et al.

(10) Patent No.: US 12,051,427 B2
(45) Date of Patent: Jul. 30, 2024

(54) DETERMINING CORRECTIONS TO BE APPLIED TO A MULTICHANNEL AUDIO SIGNAL, ASSOCIATED CODING AND DECODING

(71) Applicant: Orange, Issy-les-Moulineaux (FR)

(72) Inventors: Pierre Clément Mahe, Chatillon (FR); Stéphane Ragot, Chatillon (FR); Jerome Daniel, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 250 days.

(21) Appl. No.: 17/764,064

(22) PCT Filed: Sep. 24, 2020

(86) PCT No.: PCT/FR2020/051668
§ 371 (c)(1),
(2) Date: Mar. 25, 2022

(87) PCT Pub. No.: WO2021/064311
PCT Pub. Date: Apr. 8, 2021

(65) Prior Publication Data

US 2022/0358937 A1 Nov. 10, 2022

(30) Foreign Application Priority Data

Oct. 2, 2019 (FR) ....................................... 1910907

(51) Int. Cl.
*G10L 19/008* (2013.01)
*H04S 3/00* (2006.01)
(Continued)

(52) U.S. Cl.
CPC ............ *G10L 19/008* (2013.01); *H04S 3/008* (2013.01); *H04S 3/02* (2013.01); *H04S 7/30* (2013.01);
(Continued)

(58) Field of Classification Search
CPC ......... G10L 19/008; H04S 3/008; H04S 3/02; H04S 7/30; H04S 2400/01; H04S 2400/03; H04S 2420/11
(Continued)

(56) References Cited

U.S. PATENT DOCUMENTS 10,930,290 B2 2/2021 Fatus et al.
2007/0002971 A1* 1/2007 Purnhagen ............ G10L 19/167 375/316
(Continued)

FOREIGN PATENT DOCUMENTS

EP 2717261 A1 4/2014
EP 3067886 A1 9/2016
(Continued)

OTHER PUBLICATIONS

3GPP Technical Specification, "3rd Generation Partnership Project; Technical Specification Group Services and System Aspects; Objective test methodologies for the evaluation of immersive audio systems (Release 15)", 26.260 V15.1.0 (Dec. 2018).
(Continued)

*Primary Examiner* — Thjuan K Addy
(74) *Attorney, Agent, or Firm* — David D. Brush; Westman, Champlin & Koehler, P.A.

(57) ABSTRACT

A method and device for determining a set of corrections to be made to a multichannel sound signal, in which the set of corrections is determined on the basis of an item of information representative of a spatial image of an original multichannel signal and an item of information representative of a spatial image of the original multichannel signal that has been coded and then decoded.

17 Claims, 4 Drawing Sheets

(51) Int. Cl.
*H04S 3/02* (2006.01)
*H04S 7/00* (2006.01)

(52) U.S. Cl.
CPC ....... *H04S 2400/01* (2013.01); *H04S 2400/03* (2013.01); *H04S 2400/11* (2013.01); *H04S 2400/13* (2013.01); *H04S 2420/07* (2013.01); *H04S 2420/11* (2013.01)

(58) Field of Classification Search
USPC .............................. 381/22, 1, 19, 20, 21, 23
See application file for complete search history.

(56) References Cited

U.S. PATENT DOCUMENTS

| | | | |
|---|---|---|---|
| 2011/0103591 | A1 | 5/2011 | Ojala |
| 2019/0066701 | A1 | 2/2019 | Fatus et al. |
| 2021/0110835 | A1 | 4/2021 | Fatus et al. |

FOREIGN PATENT DOCUMENTS

| | | | |
|---|---|---|---|
| WO | 2010000313 | A1 | 1/2010 |
| WO | 2015003027 | A1 | 1/2015 |
| WO | 2017153697 | A1 | 9/2017 |

OTHER PUBLICATIONS

S. Tervo, "Direction estimation based on sound intensity vectors", 17th European Signal Processing Conference (EUSIPCO 2009), 2009.

3GPP Technical Specification, "3rd Generation Partnership Project; Technical Specification Group Services and System Aspects; Virtual Reality (VR) media services over 3GPP (Release 15)," 26.918 V15.2.0 (Mar. 2018).

B. Rafaely, "Fundamentals of Spherical Array Processing", Springer Topics in Signal Processing, vol. 8, dated 2015.

3GPP, "pCR to 26.118 on Dolby VRStream audio profile candidate (clause X.6.2.3.5)", TSG-SA4 Meeting #99 S4-180975, Rome, Italy, Jul. 9-13, 2018 revision of S4-180965.

Pierre Lecomte et al., "On the use of a Lebedev grid for Ambisonics", Audio Engineering Society Convention Paper 9433, Presented at 139th Convention, New York, 2015.

J. Fliege and U. Maier, "A two-stage approach for computing cubature formulae for the sphere", Technical Report, Dortmund University, 1999.

R. H. Hardin and N. J. A. Sloane, "McLaren's Improved Snub Cube and Other New Spherical Designs in Three Dimensions", Discrete and Computational Geometry, 15 (1996), Jul. 23, 2002, pp. 429-441.

V.I. Lebedev, and D.N. Laikov, "A quadrature formula for the sphere of the 131st algebraic order of accuracy", Papers of the Academy of Sciences, vol. 366, No. 6, 1999, pp. 741-745.

International Search Report dated Jan. 13, 2021 for corresponding International Application No. PCT/FR2020/051668, Sep. 24, 2020.

Written Opinion of the International Searching Authority dated Jan. 13, 2021 for corresponding International Application No. PCT/FR2020/051668, filed Sep. 24, 2020.

International Preliminary Report on Patentability and English translation of the Written Opinion of the International Searching Authority dated Jan. 20, 2021 for corresponding International Application No. PCT/FR2020/051668, filed Sep. 24, 2020.

* cited by examiner

DETERMINING CORRECTIONS TO BE APPLIED TO A MULTICHANNEL AUDIO SIGNAL, ASSOCIATED CODING AND DECODING

CROSS-REFERENCE TO RELATED APPLICATIONS

This Application is a Section 371 National Stage Application of International Application No. PCT/FR2020/051668, filed Sep. 24, 2020, which is incorporated by reference in its entirety and published as WO 2021/064311 A1 on Apr. 8, 2021, not in English.

FIELD OF THE DISCLOSURE

The present invention relates to the coding/decoding of spatialized sound data, in particular in an ambiophonic context (hereinafter also denoted "ambisonic").

BACKGROUND OF THE DISCLOSURE

Encoders/decoders (hereinafter called "codecs") that are currently used in mobile telephony are mono (a single signal channel to be rendered on a single loudspeaker). The 3GPP EVS (for "Enhanced Voice Services") codec makes it possible to offer "Super-HD" quality (also called "High Definition Plus" or HD+ voice) with a super-wideband (SWB) audio band for signals sampled at 32 or 48 kHz or a full band (FB) audio band for signals sampled at 48 kHz; the audio bandwidth is 14.4 to 16 kHz in SWB mode (9.6 to 128 kbit/s) and 20 kHz in FB mode (16.4 to 128 kbit/s).

The next quality evolution in conversational services offered by operators should consist of immersive services, using terminals such as smartphones equipped with multiple microphones or remote presence or 360° video spatialized audio-conferencing or video-conferencing equipment, or even "live" audio content sharing equipment, with spatialized 3D sound rendering that is much more immersive than simple 2D stereo rendering. With the increasingly widespread use of listening on a mobile telephone with an audio headset and the onset of advanced audio equipment (accessories such as a 3D microphone, voice assistants with acoustic antennas, virtual reality headsets, etc.), capturing and rendering spatialized sound scenes is now commonplace enough to offer an immersive communication experience.

To this end, the future 3GPP standard "IVAS" (for "Immersive Voice And Audio Services") is proposing to extend the EVS codec for immersion by accepting, as codec input format, at least the spatialized sound formats listed below (and their combinations):

- stereo or 5.1 multichannel (channel-based) format, in which each channel feeds a loudspeaker (for example L and R in stereo or L, R, Ls, Rs and C in 5.1);
- object (object-based) format, in which sound objects are described as an audio signal (generally mono) associated with metadata describing the attributes of this object (position in space, spatial width of the source, etc.),
- ambisonic (scene-based) format, which describes the sound field at a given point, generally captured by a spherical microphone or synthesized in the domain of spherical harmonics.

What is typically of interest below is the coding of a sound in the ambisonic format, by way of exemplary embodiment (at least some aspects presented in connection with the invention below also being able to apply to formats other than ambisonics).

Ambisonics is a method for recording ("coding" in the acoustic sense) spatialized sound and a system for reproduction ("decoding" in the acoustic sense). A (1st-order) ambisonic microphone comprises at least four capsules (typically of cardioid or sub-cardioid type) arranged on a spherical grid, for example the vertices of a regular tetrahedron. The audio channels associated with these capsules are called the "A-format". This format is converted into a "B-format", in which the sound field is decomposed into four components (spherical harmonics) denoted W, X, Y, Z, which correspond to four coincident virtual microphones. The component W corresponds to omnidirectional capturing of the sound field, while the components X, Y and Z, which are more directional, are similar to pressure gradient microphones oriented along the three orthogonal axes of space. An ambisonic system is a flexible system in the sense that recording and rendering are separate and decoupled. It allows decoding (in the acoustic sense) on any configuration of loudspeakers (for example binaural, 5.1 or 7.1.4 periphonic (with elevation) "surround" sound). The ambisonic approach may be generalized to more than four channels in B-format, and this generalized representation is commonly called "HOA" (for "Higher-Order Ambisonics"). Decomposing the sound into more spherical harmonics improves the spatial rendering precision when rendering on loudspeakers.

An Mth-order ambisonic signal comprises $K=(M+1)^2$ components and, in the 1st order (if M=1), there are the four components W, X, Y, and Z, commonly called FOA (for First-Order Ambisonics). There is also what is called a "planar" variant of ambisonics (W, X, Y), which decomposes the sound defined in a plane that is generally the horizontal plane. In this case, the number of components is K=2M+1 channels. 1st-order ambisonics (4 channels: W, X, Y, Z), planar 1st-order ambisonics (3 channels: W, X, Y) and higher-order ambisonics are all referred to below indiscriminately as "ambisonics" for ease of reading, the processing operations that are presented being applicable independently of the planar or non-planar type and the number of ambisonic components.

Hereinafter, "ambisonic signal" will be the name given to a predetermined-order signal in B-format with a certain number of ambisonic components. This also comprises hybrid cases, in which for example there are only 8 channels (instead of 9) in the 2nd order—more precisely, in the 2nd order, there are the 4 1st-order channels (W, X, Y, Z) plus normally 5 channels (usually denoted R, S, T, U, V), and it is possible for example to ignore one of the higher-order channels (for example R).

The signals to be processed by the encoder/decoder take the form of successions of blocks of sound samples called "frames" or "sub-frames" below.

Furthermore, below, mathematical notations follow the following convention:

- Scalar: s or N (lower-case for variables or upper-case for constants)
- the operator Re(.) denotes the real part of a complex number
- Vector: u (lower-case, bold)
- Matrix: A (upper-case, bold)

The notations $\mathbf{A}^T$ and $\mathbf{A}^H$ indicate, respectively, the transposition and the Hermitian transposition (transposed and conjugated) of A.

A one-dimensional discrete-time signal, s(i), defined over a time interval i=0, . . . , L−1 of length L is represented by a row vector $$s=[s(0), \ldots ,s(L-1)].$$

It is also possible to write: $s=[s_0, \ldots , s_{L-1}]$ to avoid using parentheses.

A multidimensional discrete-time signal, b(i), defined over a time interval i=0, . . . , L−1 of length L and with K dimensions is represented by a matrix of size L×K:

$$B = \begin{bmatrix} b_0(0) & \ldots & b_0(L-1) \\ \vdots & \ldots & \vdots \\ b_{K-1}(0) & \ldots & b_{K-1}(L-1) \end{bmatrix}.$$

It is also possible to denote: $B=[B_{ij}]$, i=0, . . . K−1, j=0 . . . L−1, to avoid using parentheses.

A 3D point with Cartesian coordinates (x,y,z) may be converted into spherical coordinates (r, θ, φ), where r is the distance to the origin, θ is the azimuth and φ is the elevation. Use is made here, without loss of generality, of the mathematical convention in which elevation is defined with respect to the horizontal plane (0xy); the invention may easily be adapted to other definitions, including the convention used in physics in which the azimuth is defined with respect to the axis Oz.

Moreover, no reminder is given here of the conventions known from the prior art in ambisonics regarding the order of the ambisonic components (including ACN for Ambisonic Channel Number, SID for Single Index Designation, FuMA for Furse-Malham) and the normalization of ambisonic components (SN3D, N3D, maxN). More details may be found for example in the resource available online: https://en.wikipedia.org/wiki/Ambisonic_data_exchange_formats By convention, the first component of an ambisonic signal generally corresponds to the omnidirectional component W.

The simplest approach for coding an ambisonic signal consists in using a mono encoder and applying it in parallel to all channels with possibly a different bit allocation depending on the channels. This approach is called "multi-mono" here. The multi-mono approach may be extended to multi-stereo coding (in which pairs of channels are coded separately by a stereo codec) or more generally to the use of multiple parallel instances of the same core codec.

Such an embodiment is shown in FIG. 1. The input signal is divided into channels (one mono channel or multiple channels) by the block 100. These channels are coded separately by blocks 120 to 122 based on a predetermined distribution and bit allocation. Their bitstream is multiplexed (block 130) and, after transmission and/or storage, it is demultiplexed (block 140) in order to apply decoding in order to reconstruct the decoded channels (blocks 150 to 152), which are recombined (block 160).

The associated quality varies depending on the core coding and decoding used (blocks 120 to 122 and 150 to 152), and it is generally satisfactory only at a very high bit rate. For example, in the multi-mono case, EVS coding may be considered to be quasi-transparent (from a perceptual point of view) at a bit rate of at least 48 kbit/s per channel (mono); thus, for a 1st-order ambisonic signal, a minimum bit rate of 4×48=192 kbit/s is obtained. Since the multi-mono coding approach does not take into account inter-channel correlation, it produces spatial deformations with the addition of various artifacts, such as the appearance of ghost sound sources, diffuse noises or displacements of sound source trajectories. Coding an ambisonic signal using this approach thus leads to degradations of the spatialization.

One alternative approach to separately coding all of the channels is given, for a stereo or multichannel signal, by parametric coding. For this type of coding, the input multichannel signal is reduced to a smaller number of channels, after a processing operation called a "downmix", these channels are coded and transmitted and additional spatialization information is also coded. Parametric decoding consists in increasing the number of channels after decoding the transmitted channels, using a processing operation called an "upmix" (typically implemented through decorrelation) and a spatial synthesis based on the decoded additional spatialization information. One example of stereo parametric coding is given by the 3GPP e-AAC+ codec. It will be noted that the downmix operation also leads to degradations of the spatialization; in this case, the spatial image is modified.

SUMMARY

The invention aims to improve the prior art.

To this end, it proposes a method for determining a set of corrections to be made to a multichannel sound signal, wherein the set of corrections is determined from information representative of a spatial image of an original multichannel signal and from information representative of a spatial image of the original coded and then decoded multichannel signal.

The determined set of corrections to be applied to the decoded multichannel signal thus makes it possible to limit spatial degradations due to the coding and possibly to channel reduction/increase operations. Implementing the correction thus makes it possible to recover a spatial image of the decoded multichannel signal closest to the spatial image of the original multichannel signal.

In one particular embodiment, the set of corrections is determined in the full-band time domain (one frequency band). In some variants, this is performed in the time domain by frequency sub-band. This makes it possible to adapt the corrections according to the frequency bands.

In other variants, this is performed in a real or complex transformed domain (typically frequency domain) of the short-time discrete Fourier transform (STFT), modified discrete cosine transform (MDCT) type or the like.

The invention also relates to a method for decoding a multichannel sound signal, comprising the following steps:

- receiving a bitstream comprising a coded audio signal from an original multichannel signal and information representative of a spatial image of the original multichannel signal;
- decoding the received coded audio signal and obtaining a decoded multichannel signal;
- decoding the information representative of a spatial image of the original multichannel signal;
- determining information representative of a spatial image of the decoded multichannel signal;
- determining a set of corrections to be made to the decoded signal using the determination method described above;
- correcting the decoded multichannel signal using the determined set of corrections.

Thus, in this embodiment, the decoder is able to determine the corrections to be made to the decoded multichannel signal, from information representative of the spatial image of the original multichannel signal, received from the encoder. The information received from the encoder is thus limited. It is the decoder that is responsible for both determining and applying the corrections.

The invention also relates to a method for coding a multichannel sound signal, comprising the following steps:

- coding an audio signal from an original multichannel signal;
- determining information representative of a spatial image of the original multichannel signal;
- locally decoding the coded audio signal and obtaining a decoded multichannel signal;
- determining information representative of a spatial image of the decoded multichannel signal;
- determining a set of corrections to be made to the decoded multichannel signal using the determination method described above;
- coding the determined set of corrections.

In this embodiment, it is the encoder that determines the set of corrections to be made to the decoded multichannel signal and that transmits it to the decoder.

It is therefore the encoder that initiates this correction determination.

In a first particular embodiment of the decoding method as described above or of the coding method as described above, the information representative of a spatial image is a covariance matrix, and determining the set of corrections furthermore comprises the following steps:

- obtaining a weighting matrix comprising weighting vectors associated with a set of virtual loudspeakers;
- determining a spatial image of the original multichannel signal from the obtained weighting matrix and from the received covariance matrix of the original multichannel signal;
- determining a spatial image of the decoded multichannel signal from the obtained weighting matrix and from the covariance matrix of the determined decoded multichannel signal;
- computing a ratio between the spatial image of the original multichannel signal and the spatial image of the decoded multichannel signal in the directions of the loudspeakers of the set of virtual loudspeakers, in order to obtain a set of gains.

According to this embodiment, this method using rendering on loudspeakers makes it possible to transmit only a limited amount of data from the encoder to the decoder.

Indeed, for a given order M, $K=(M+1)^2$ coefficients to be transmitted (associated with the same number of virtual loudspeakers) may be sufficient, but for a more stable correction, it may be recommended to use more virtual loudspeakers and therefore to transmit more points. Moreover, the correction is easily able to be interpreted in terms of gains associated with virtual loudspeakers.

In another variant embodiment, if the encoder directly determines the energy of the signal in various directions and transmits this spatial image of the original multichannel signal to the decoder, determining the set of corrections for the decoding method furthermore comprises the following steps:

- obtaining a weighting matrix comprising weighting vectors associated with a set of virtual loudspeakers;
- determining a spatial image of the decoded multichannel signal from the obtained weighting matrix and from the information representative of a spatial image of the determined decoded multichannel signal;
- computing a ratio between the spatial image of the original multichannel signal and the spatial image of the decoded multichannel signal in the directions of the loudspeakers of the set of virtual loudspeakers, in order to obtain a set of gains.

In order to guarantee a correction value that is not too drastic, the decoding method or the coding method comprises a step of limiting the values of gains obtained in line with at least one threshold.

This set of gains constitutes the set of corrections and may for example be in the form of a correction matrix comprising the set of gains thus determined.

In a second particular embodiment of the decoding method or of the coding method, the information representative of a spatial image is a covariance matrix, and determining the set of corrections comprises a step of determining a transformation matrix through matrix decomposition of the two covariance matrices, the transformation matrix constituting the set of corrections.

This embodiment has the advantage of making the corrections directly in the ambisonic domain in the case of an ambisonic multichannel signal. The steps of transforming the signals rendered on loudspeakers into the ambisonic domain are thus avoided. This embodiment additionally makes it possible to optimize the correction so that it is optimum in mathematical terms, even though it requires the transmission of a greater number of coefficients in comparison with the method with rendering on loudspeakers.

Indeed, for an order M and therefore a number of components $K=(M+1)^2$, the number of coefficients to be transmitted is $Kx(K+1)/2$.

In order to avoid excessive amplification over certain frequency areas, a normalization factor is determined and applied to the transformation matrix.

If the set of corrections is represented by a transformation matrix or a correction matrix as described above, the decoded multichannel signal is corrected by the determined set of corrections by applying the set of corrections to the decoded multichannel signal, that is to say directly in the ambisonic domain in the case of an ambisonic signal.

In the embodiment with rendering on loudspeakers implemented by the decoder, the decoded multichannel signal is corrected using the determined set of corrections in the following steps:

- acoustically decoding the decoded multichannel signal on the defined set of virtual loudspeakers;
- applying the obtained set of gains to the signals resulting from the acoustic decoding;
- acoustically coding the corrected signals resulting from the acoustic decoding in order to obtain components of the multichannel signal;
- summing the components of the multichannel signal thus obtained in order to obtain a corrected multichannel signal.

In one variant embodiment, the above decoding, applying gains and coding/summing steps are grouped together into a direct correction operation using a correction matrix.

This correction matrix may be applied directly to the decoded multichannel signal, this having the advantage, as described above, of making the corrections directly in the ambisonic domain.

In a second embodiment, in which the coding method implements the method for determining the set of corrections, the decoding method comprises the following steps:

- receiving a bitstream comprising a coded audio signal from an original multichannel signal and a coded set of corrections to be made to the decoded multichannel signal, the set of corrections having been coded using a coding method described above;

decoding the received coded audio signal and obtaining a decoded multichannel signal;

decoding the coded set of corrections;

correcting the decoded multichannel signal by applying the decoded set of corrections to the decoded multichannel signal.

In this embodiment, it is the encoder that determines the corrections to be made to the decoded multichannel signal, directly in the ambisonic domain, and it is the decoder that applies these corrections to the decoded multichannel signal, directly in the ambisonic domain.

The set of corrections may in this case be a transformation matrix or else a correction matrix comprising a set of gains.

In one variant embodiment of the decoding method with rendering on loudspeakers, the decoding method comprises the following steps:

receiving a bitstream comprising a coded audio signal from an original multichannel signal and a coded set of corrections to be made to the decoded multichannel signal, the set of corrections having been coded using a coding method as described above;

decoding the received coded audio signal and obtaining a decoded multichannel signal;

decoding the coded set of corrections;

correcting the decoded multichannel signal using the decoded set of corrections in the following steps:

acoustically decoding the decoded multichannel signal on the defined set of virtual loudspeakers;

applying the obtained set of gains to the signals resulting from the acoustic decoding;

acoustically coding the corrected signals resulting from the acoustic decoding in order to obtain components of the multichannel signal;

summing the components of the multichannel signal thus obtained in order to obtain a corrected multichannel signal.

In this embodiment, it is the encoder that determines the corrections to be made to the signals resulting from the acoustic decoding on a set of virtual loudspeakers, and it is the decoder that applies these corrections to the signals resulting from the acoustic decoding and then that transforms these signals so as to return to the ambisonic domain in the case of an ambisonic multichannel signal.

In one variant embodiment, the above decoding, applying gains and coding/summing steps are grouped together into a direct correction operation using a correction matrix.

The correction is then performed directly by applying a correction matrix to the decoded multichannel signal, for example the ambisonic signal. As described above, this has the advantage of making the corrections directly in the ambisonic domain.

The invention also relates to a decoding device comprising a processing circuit for implementing the decoding methods as described above.

The invention also relates to a decoding device comprising a processing circuit for implementing the coding methods as described above.

The invention relates to a computer program comprising instructions for implementing the decoding methods or the coding methods as described above when they are executed by a processor.

The invention relates lastly to a storage medium, able to be read by a processor, storing a computer program comprising instructions for executing the decoding methods or the coding methods described above.

BRIEF DESCRIPTION OF THE DRAWINGS

Other features and advantages of the invention will become more clearly apparent upon reading the following description of particular embodiments, provided by way of simple illustrative and nonlimiting examples, and the appended drawings, in which.

DETAILED DESCRIPTION OF ILLUSTRATIVE EMBODIMENTS

The method described below is based on correcting spatial degradations, in particular in order to ensure that the spatial image of the decoded signal is as close as possible to the original signal. Unlike known parametric coding approaches for stereo or multichannel signals, in which perceptual cues are coded, the invention is not based on a perceptual interpretation of spatial image information, since the ambisonic domain is not directly "hearable".

Figure 1:
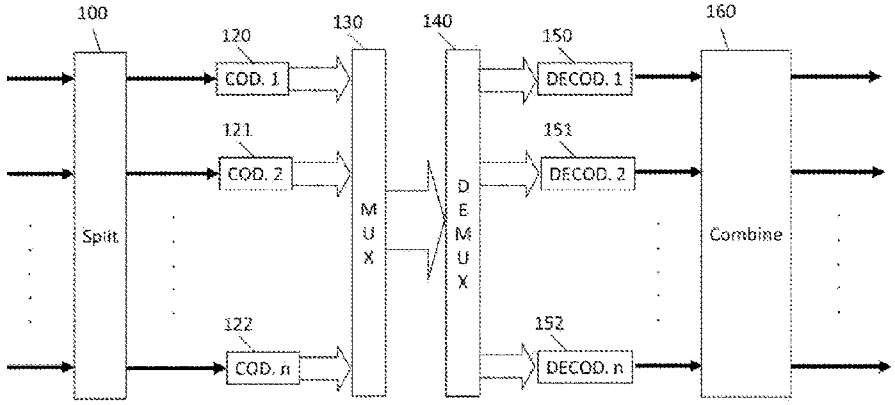
FIG.1 (Prior art)
FIG. 1 illustrates multi-mono coding according to the prior art and as described above.
Figure 2:
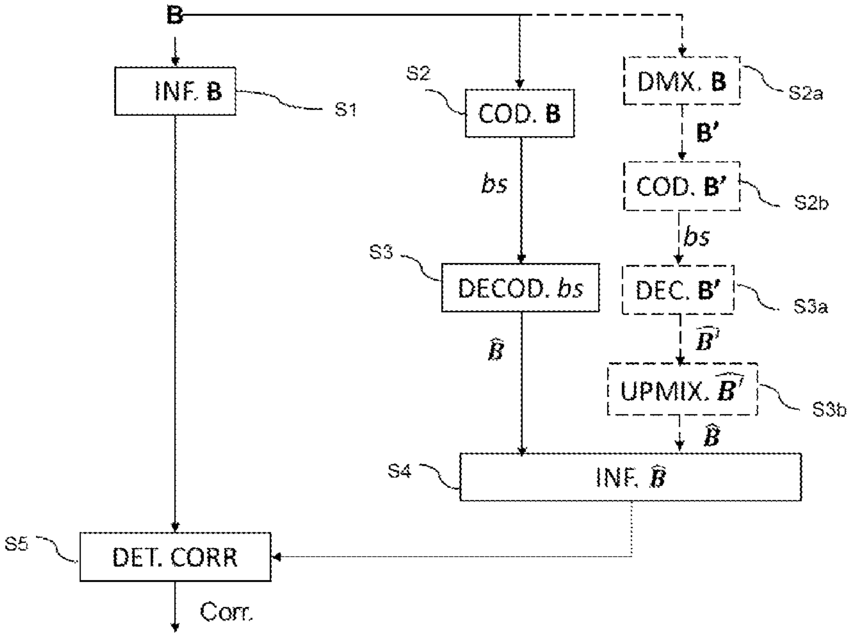
FIG. 2 illustrates, in the form of a flowchart, the steps of a method for determining a set of corrections according to one embodiment of the invention.

FIG. 2 shows the main steps implemented to determine a set of corrections to be applied to the coded and then decoded multichannel signal.

The original multichannel signal B of dimension K×L (that is to say K components of L time or frequency samples) is at the input of the determination method. In step S1, information representative of a spatial image of the original multichannel signal is extracted.

What is of interest here is the case of a multichannel signal with an ambisonic representation, as described above. The invention may also be applied to other types of multichannel signal, such as a B-format signal with modifications, such as for example the suppression of certain components (for example suppression of the 2nd-order R component so as to keep only 8 channels) or the matrixing of the B-format in order to pass to an equivalent domain (called "Equivalent Spatial Domain") as described in the 3GPP TS 26.260 specification—another example of matrixing is given by "channel mapping 3" of the IETF Opus codec and in the 3GPP TS 26.918 specification (clause 6.1.6.3).

A "spatial image" is the name given here to the distribution of the sound energy of the ambisonic sound scene in various directions in space; in some variants, this spatial image describing the sound scene generally corresponds to positive values evaluated in various predetermined directions in space, for example in the form of a MUSIC (MUltiple SIgnal Classification) pseudo-spectrum sampled in these directions or a histogram of directions of arrival (in which the directions of arrival are counted according to the discretization given by the predetermined directions); these positive values may be interpreted as energies and are seen as such below in order to simplify the description of the invention.

A spatial image associated with an ambisonic sound scene therefore represents the relative sound energy (or more generally a positive value) as a function of various directions in space. In the invention, information representative of a spatial image may be for example a covariance matrix computed between the channels of the multichannel signal or else energy information associated with directions from which the sound originates (associated with directions of virtual loudspeakers distributed over a unit sphere).

The set of corrections to be applied to a multichannel signal is information that may be defined by a set of gains associated with directions from which the sound originates, which may be in the form of a correction matrix comprising this set of gains or a transformation matrix.

A covariance matrix of a multichannel signal B is for example obtained in step S1. As described later with reference to FIGS. 3 and 6, this matrix is for example computed as follows:

$C=B.B^T$ to within a normalization factor (in the real case) or $C=Re(B.B^H)$ to within a normalization factor (in the complex case)

In some variants, operations of temporally smoothing the covariance matrix may be used. In the cases of a multichannel signal in the time domain, the covariance may be estimated recursively (sample by sample) in the following form:

$$Cij(n)=n/(n+1)Cij(n-1)+1/(n+1)bi(n)bj(n).$$

In one variant embodiment, energy information is obtained in various directions (associated with directions of virtual loudspeakers distributed over a unit sphere). For this purpose, an SRP (for "Steered-Response Power") method, described later with reference to FIGS. 3 and 4, may for example be applied. In some variants, other spatial image computing methods (MUSIC pseudo-spectrum, histogram of directions of arrival) may be used.

Multiple embodiments are conceivable and described here for coding the original multichannel signal.

In a first embodiment, the various channels $b_k$, k=0, K−1, of B are coded, in step S2, using multi-mono coding, each channel $b_k$ being coded separately. In some variant embodiments, multi-stereo coding in which the channels $b_k$ are coded in separate pairs is also possible. One conventional example for a 5.1 input signal consists in using two separate stereo coding operations of L/R and Ls/Rs with C and LFE (low frequencies only) mono coding operations; for the ambisonic case, multi-stereo coding may be applied to the ambisonic components (B-format) or to an equivalent multichannel signal obtained after matrixing the channels in the B-format—for example, in the 1st order, the channels W, X, Y, Z may be converted into four transformed channels, and two pairs of channels are coded separately and converted back to B-format in the decoding.

One example is given in the recent versions of the Opus codec ("channel mapping 3") and in the 3GPP TR 26.918 specification (clause 6.1.6.3).

In other variants, it is also possible to use, in step S2, joint multichannel coding, such as for example the MPEG-H 3D Audio codec for the ambisonic (scene-based) format; in this case, the codec codes the input channels jointly. In the MPEG-H example, this joint coding is decomposed, for an ambisonic signal, into multiple steps, such as extracting and coding predominant mono sources, extracting an ambiance (typically reduced to a 1st-order ambisonic signal), coding all of the extracted channels (called "transport channels") and metadata describing the acoustic beamforming vectors in order to extract predominant channels. Joint multichannel coding makes it possible to exploit the relationships between all of the channels in order for example to extract predominant audio sources and an ambience or perform an overall bit allocation that takes into account all of the audio content.

In the preferred embodiment, the exemplary embodiment of step S2 is multi-mono coding that is performed using the 3GPP EVS codec as described above. However, the method according to the invention may thus be used independently of the core codec (multi-mono, multi-stereo, joint coding) used to represent the channels to be coded.

The signal thus coded in the form of a bitstream may be decoded in step S3 either by a local decoder of the encoder or by a decoder after transmission. This signal is decoded in order to recover the channels of the multichannel signal $\hat{B}$ (for example by multiple EVS decoder instances using multi-mono decoding).

Steps S2*a*, S2*b*, S3*a*, S3*b* represent one variant embodiment of the coding and decoding of the multichannel signal B. The difference with the coding of step S2 described above lies in the use of additional processing operations for reducing the number of channels ("downmix") in step S2*a* and increasing the number of channels ("upmix") in step S3*b*. These coding and decoding steps (S2*b* and S3*a*) are similar to steps S2 and S3, except that the number of respective input and output channels is lower in steps S2*b* and S3*a*.

One example of downmixing for a 1st-order ambisonic input signal consists in keeping only the W channel; for an ambisonic input signal of order >1, the first 4 components W, X, Y, Z may be taken as downmix (therefore truncate the signal to the 1st order). In some variants, a subset of the ambisonic components (for example 8 2nd-order channels without the component R) may be taken as downmix, and the cases of matrixing may also be considered, such as for example a stereo downmix obtained in the following form: L=W−Y+0.3*X, R=W+Y+0.3*X (using only FOA channels).

One example of upmixing a mono signal consists in applying various spatial room impulse responses (SRIR) or various decorrelating filters (of the all-pass type) in the time or frequency domain. One exemplary embodiment of decorrelation in a frequency domain is given for example in document 3GPP S4-180975, pCR to 26.118 on Dolby VRStream audio profile candidate (clause X.6.2.3.5).

The signal B' resulting from this "downmix" processing operation is coded in step S2*b* by a core codec (multi-mono, multi-stereo, joint coding), for example using a mono or multi-mono approach with the 3GPP EVS codec. The input audio signal from coding step S2*b* and the output audio signal from decoding step S3*a* have a lower number of channels than the original multichannel audio signal. In this case, the spatial image represented by the core codec is already substantially degraded even before coding. In an extreme case, the number of channels is reduced to a single mono channel, by coding only the W channel; the input signal is then limited to a single audio channel and the spatial image is therefore lost. The method according to the invention makes it possible to describe and reconstruct this spatial image as closely as possible to that of the original multichannel signal.

At the output of the upmix step in S3*b* of this variant embodiment, a decoded multichannel signal $\hat{B}$ is recovered.

In step S4, information representative of the spatial image of the decoded multichannel signal is extracted from the decoded multichannel signal $\hat{B}$ according to the two variants (S2-S3 or S2*a*-S2*b*-S3*a*-S3*b*). In the same way as for the original image, this information may be a covariance matrix computed on the decoded multichannel signal or else energy information associated with directions from which the sound originates (or, equivalently, with virtual points on a unit sphere).

This information representative of the original multichannel signal and of the decoded multichannel signal is used in step S5 to determine a set of corrections to be made to the decoded multichannel signal in order to limit spatial degradations.

Two embodiments will be described below with reference to FIGS. 4 and 5 to illustrate this step.

The method described in FIG. 2 may be implemented in the time domain, in frequency full-band (with a single band) or else by frequency sub-bands (with multiple bands), and this does not change the operation of the method, each sub-band then being processed separately. If the method is performed by sub-band, the set of corrections is then determined per sub-band, this causing an extra cost in terms of computing and data to be transmitted to the decoder in comparison with the case of a single band. The division into sub-bands may be uniform or non-uniform. For example, the spectrum of a signal sampled at 32 kHz may be divided according to various variants:

- 4 bands with a respective width of 1, 3, 4 and 8 kHz or even 2, 2, 4 and 8 kHz
- 24 Bark bands (from a width of 100 Hz at low frequencies to 3.5-4 kHz for the last sub-band)
- the 24 Bark bands may possibly be grouped together into blocks of 4 or 6 successive bands in order to form a set of 6 or 4 "agglomerated" bands, respectively.

Other divisions are possible (for example ERB bands—for "equivalent rectangular bandwidth"—or into ⅓ of an octave), including for the case of a different sampling frequency (for example 16 or 48 kHz).

In some variants, the invention may also be implemented in a transformed domain, for example in the domain of the short-time discrete Fourier transform (STFT) or the domain of the modified discrete cosine transform (MDCT).

Multiple embodiments are now described for implementing the determination of this set of corrections and for applying this set of corrections to the decoded signal.

A reminder is given here of the known technique for encoding a sound source in the ambisonic format. A mono sound source may be artificially spatialized by multiplying its signal by the values of the spherical harmonics associated with its direction of origin (assuming the signal is carried by a plane wave) in order to obtain the same number of ambisonic components. This involves computing the coefficients for each spherical harmonic for a position determined in azimuth θ and in elevation φ in the desired order:

$$B=Y(\theta,\phi).s$$

where s is the mono signal to be spatialized and Y(θ, φ) is the encoding vector defining the coefficients of the spherical harmonics associated with the direction (θ, φ) for the Mth order. One example of an encoding vector is given below for the 1st order with the SN3D convention and the order of the SID or FuMa channels:

$$Y(\theta,\varphi)=\begin{bmatrix}1\\ \cos\theta\cos\varphi\\ \sin\theta\cos\varphi\\ \sin\varphi\end{bmatrix}$$

In some variants, other normalization conventions (for example: maxN, N3D) and channel orders (for example: ACN) may be used, and the various embodiments are then adapted according to the convention used for the order of the one or more normalizations of the ambisonic components (FOA or HOA). This is tantamount to modifying the order of the rows Y(θ, φ) or multiplying these rows by predefined constants.

For higher orders, the coefficients Y(θ, φ) of the spherical harmonics may be found in the book by B. Rafaely, Fundamentals of Spherical Array Processing, Springer, 2015. In general, for an order M, there are $K=(M+1)^2$ ambisonic signals.

Likewise, a reminder will be given here of a few concepts regarding ambisonic rendering by loudspeakers. An ambisonic sound is not meant to be listened to as such; for immersive listening on loudspeakers or on headphones, a "decoding" step in the acoustic sense, also called rendering ("renderer"), has to be carried out. Consideration is given to the case of N (virtual or physical) loudspeakers distributed over a sphere—typically with a unit radius—and whose directions $(\theta_n, \varphi_n)$, n=0, . . . , N−1, in terms of azimuth and elevation, are known. Decoding, as considered here, is a linear operation that consists in applying a matrix D to the ambisonic signals B in order to obtain the signals $s_n$ of the loudspeakers, which may be combined into a matrix $S=[s_0, \ldots s_{N-1}]$, S=D.B, where $$S=\begin{bmatrix}s_0\\ \vdots\\ s_{N-1}\end{bmatrix}.$$

The matrix D may be decomposed into row vectors $d_n$, that is to say $$D=\begin{bmatrix}d_0\\ \vdots\\ d_{N-1}\end{bmatrix}$$

$d_n$ may be seen as a weighting vector for the nth loudspeaker, used to recombine the components of the ambisonic signal and compute the signal played on the nth loudspeaker: $s_n=d_n.B$.

There are multiple methods for "decoding" in the acoustic sense. What is known as the "basic decoding" method, also called "mode-matching", is based on the encoding matrix E associated with all of the directions of virtual loudspeakers:

$$E=[Y(\theta_0,\varphi_0)\ \ldots\ Y(0_{N-1},\varphi_{N-1})]$$

According to this method, the matrix D is typically defined as the pseudo-inverse of E:

$$D=\mathrm{pinv}(E)=D^T(D.D^T)^{-1}$$

As an alternative, the method that may be called the "projection" method gives similar results for certain regular distributions of directions, and is described by the equation:

$$D=\frac{1}{N}E^T$$

In the latter case, it may be seen that, for each direction of index n, $$d_n = \frac{1}{N} Y(\theta_n, \varphi_n)^T$$

In the context of this invention, such matrices will serve as a directional beamforming matrix that describes how to obtain signals characteristic of directions in space in order to perform an analysis and/or spatial transformations.

In the context of the present invention, it is useful to describe the reciprocal conversion for passing from the loudspeaker domain to the ambisonic domain. The successive application of the two conversions should exactly reproduce the original ambisonic signals if no intermediate modification is applied in the loudspeaker domain. The reciprocal conversion is therefore defined as bringing into play the pseudo-inverse of D: pinv $(D).S=D^T(D.D^T)^{-1}.S$ When $K=(M+1)^2$, the matrix D of size K×K is able to be inverted under certain conditions and, in this case: $B=D^{-1}.S$ In the case of the "mode-matching" method, it appears that pinv(D)=E. In some variants, other methods for decoding using D may be used, with the corresponding inverse conversion E; the only condition to be met is that the combination of the decoding using D and the inverse conversion using E should give a perfect reconstruction (when no intermediate processing operation is performed between the acoustic decoding and the acoustic encoding).

Such variants are for example given by:

"mode-matching" decoding, with a regulation term in the following form $D^T(D.D^T+\varepsilon I)^{-1}$ where ε is a low value (for example 0.01), "in phase" or "max-rE" decoding, known from the prior art or variants in which the distribution of the directions of the loudspeakers is not regular over the sphere.

Figure 3:
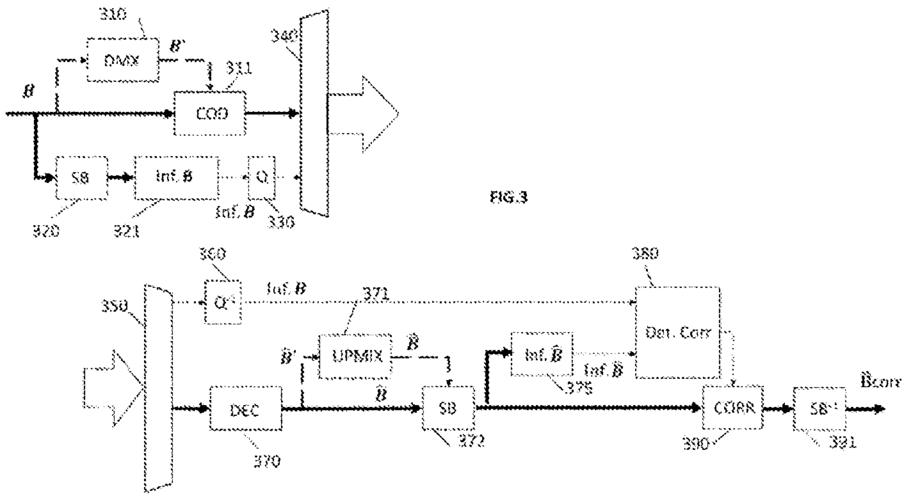
FIG. 3 illustrates a first embodiment of an encoder and a decoder, a coding method and a decoding method according to the invention.

FIG. 3 shows a first embodiment of a coding device and of a decoding device for implementing a coding and decoding method including a method for determining a set of corrections as described with reference to FIG. 2.

In this embodiment, the encoder computes the information representative of the spatial image of the original multichannel signal and transmits it to the decoder in order to allow it to correct the spatial degradation caused by the coding. This makes it possible, during decoding, to attenuate spatial artifacts in the decoded ambisonic signal.

The encoder thus receives a multichannel input signal, for example of ambisonic representation FOA, or HOA, or a hybrid representation with a subset of ambisonic components up to a given partial ambisonic order—the latter case is in fact included in equivalent fashion in the FOA or HOA case, in which the missing ambisonic components are zero and the ambisonic order is given by the minimum order required to include all of the defined components. Thus, without loss of generality, consideration is given below to the description of the FOA or HOA cases.

In the embodiment thus described, the input signal is sampled at 32 kHz. The encoder operates in frames that are preferably 20 ms long, that is to say L=640 samples per frame at 32 kHz. In some variants, other frame lengths and sampling frequencies are possible (for example L=480 samples per frame of 10 ms at 48 kHz).

In one preferred embodiment, the coding is performed in the time domain (on one or more bands), but in some variants, the invention may be implemented in a transformed domain, for example after short-time discrete Fourier transform (STFT) or modified discrete cosine transform (MDCT).

Depending on the coding embodiment used, as explained with reference to FIG. 2, a block 310 for reducing the number of channels (DMX) may be implemented; the input of block 311 is the signal B' at the output of block 310 when the downmix is implemented or the signal B if not. In one embodiment, if the downmix is applied, this consists for example, for a 1st-order ambisonic input signal, in keeping only the W channel and, for an ambisonic input signal of order >1, in keeping only the first 4 ambisonic components W, X, Y, Z (therefore in truncating the signal to the 1st order). Other types of downmix (such as those described above with a selection of a subset of channels and/or matrixing) may be implemented without this modifying the method according to the invention.

Block 311 codes the audio signal $b'_k$ of B' at the output of block 310 if the downmix step is performed, or the audio signal $b_k$ of the original multichannel signal B. This signal corresponds to the ambisonic components of the original multichannel signal if no processing operation of reducing the number of channels has been applied.

In one preferred embodiment, block 311 uses multi-mono coding (COD) with a fixed or variable allocation, in which the core codec is the standard 3GPP EVS codec. In this multi-mono approach, each channel $b_k$ or $b'_k$ is coded separately by one instance of the codec; however, in some variants, other coding methods are possible, for example multi-stereo coding or joint multichannel coding. This therefore gives, at the output of this coding block 311, a coded audio signal resulting from the original multichannel signal, in the form of a bitstream that is sent to the multiplexer 340.

Optionally, block 320 performs a division into sub-bands. In some variants, this division into sub-bands may reuse equivalent processing operations performed in blocks 310 or 311; the splitting of block 320 is functional here.

In one preferred embodiment, the channels of the original multichannel audio signal are divided into 4 frequency sub-bands with respective widths of 1 kHz, 3 kHz, 4 kHz, 8 kHz (which is tantamount to dividing the frequencies into 0-1000, 1000-4000, 4000-8000 and 8000-16000 Hz). This division may be implemented by way of a short-time discrete Fourier transform (STFT), band-pass filtering in the Fourier domain (by applying a frequency mask), and inverse transform with overlap addition. In this case, the sub-bands remain sampled at the same original frequency and the processing operation according to the invention is applied in the time domain; in some variants, it is possible to use a filter bank with critical sampling. It will be noted that the operation of dividing into sub-bands generally involves a processing delay that depends on the type of filter bank that is implemented; according to the invention, temporal alignment may be applied before or after coding-decoding and/or before the extraction of spatial image information, such that the spatial image information is well synchronized in time with the corrected signal.

In some variants, full-band processing may be performed, or the division into sub-bands may be different, as explained above.

In other variants, the signal resulting from a transform of the original multichannel audio signal is used directly, and the invention is applied in the transformed domain with a division into sub-bands in the transformed domain.

In the remainder of the description, the various steps of the coding and the decoding are described as though they involved a processing operation in the (real or complex)

time or frequency domain with a single frequency band in order to simplify the description.

It is also possible to implement, optionally, in each sub-band, high-pass filtering (with a cutoff frequency typically at 20 or 50 Hz), for example in the form of a 2nd-order elliptical IIR filter whose cutoff frequency is preferably set at 20 or 50 Hz (50 Hz in some variants). This pre-processing avoids a potential bias for the subsequent covariance estimate during the coding; without this pre-processing, the correction implemented in block 390, described later, will tend to amplify low frequencies during full-band processing.

Block 321 determines (Inf. B) information representative of a spatial image of the original multichannel signal.

In one embodiment, this information is energy information associated with directions from which the sound originates (associated with directions of virtual loudspeakers distributed over a unit sphere).

For this purpose, a virtual 3D sphere with a unit radius is defined, this 3D sphere is discretized by N points ("point" virtual loudspeakers) whose position is defined in spherical coordinates by the directions ($\theta_n$, $\varphi_n$) for the nth loudspeaker. The loudspeakers are typically placed in a (quasi-) uniform manner over the sphere. The number N of virtual loudspeakers is determined as a discretization having at least N=K points, where M is the ambisonic order of the signal and $K=(M+1)^2$, that is to say N≥K. A "Lebedev" quadrature method may for example be used to perform this discretization, in accordance with the references V. I. Lebedev, and D. N. Laikov, "A quadrature formula for the sphere of the 131st algebraic order of accuracy", Doklady Mathematics, vol. 59, no. 3, 1999, pp. 477-481 or Pierre Lecomte, Philippe-Aubert Gauthier, Christophe Langrenne, Alexandre Garcia and Alain Berry, On the use of a Lebedev grid for Ambisonics, AES Convention 139, New York, 2015.

In some variants, other discretizations may be used, such as for example a Fliege discretization with at least N=K points (N≥K), as described in the reference J. Fliege and U. Maier, "A two-stage approach for computing cubature formulae for the sphere", Technical Report, Dortmund University, 1999, or else a discretization by taking the points of a "spherical t-design" as described in the article by R. H. Hardin and N. J. A. Sloane, "McLaren's Improved Snub Cube and Other New Spherical Designs in Three Dimensions", Discrete and Computational Geometry, 15 (1996), pp. 429-441.

From this discretization, it is possible to determine the spatial image of the multichannel signal. One possible method is for example the SRP (for "Steered-Response Power") method. Indeed, this method consists in computing the short-term energy coming from various directions defined in terms of azimuth and elevation. For this purpose, as explained above, similarly to rendering on N loudspeakers, a weighting matrix of the ambisonic components is computed, and then this matrix is applied to the multichannel signal in order to sum the contribution of the components and produce a set of N acoustic beams (or "beamformers").

The signal from the acoustic beam for the direction ($\theta_n$, $\varphi_n$) of the nth loudspeaker is given by: $s_n=d_n.B$ where $d_n$ is the weighting (row) vector giving the acoustic beamforming coefficients for the given direction and B is a matrix of size KxL representing the ambisonic signal (B-format) with K components, over a time interval of length L.

The set of signals from the N acoustic beams leads to the equation: S=D.B where $$D = \begin{bmatrix} d_0 \\ \vdots \\ d_{N-1} \end{bmatrix}$$

and S is a matrix of size N×L representing the signals of N virtual loudspeakers over a time interval of length L.

The short-term energy over the time segment of length L for each direction (θ, $\varphi_n$) is:

$$\sigma_n^2=s_n.s_n^T=(d_n.B).(d_n.B)^T=d_n.B.B^T.d_n^T=d_n.C.d_n^T$$

where $C=B.B^T$ (real case) or $Re(B.B^H)$ (complex case) is the covariance matrix of B. Each term $\sigma_n^2=s_n.s_n^T$ may be computed in this way for all directions ($\theta_n$, $\varphi_n$) that correspond to a discretization of the 3D sphere by virtual loudspeakers.

The spatial image Σ is then given by:

$$\Sigma=[\sigma_0^2, \ldots, \sigma_{N-1}^2]$$

Variants for computing a spatial image Σ other than the SRP method may be used.

The values $d_n$ may vary depending on the type of acoustic beamforming used (delay-sum, MVDR, LCMV, etc.). The invention also applies to these variants of computing the matrix D and the spatial image $$\Sigma=[\sigma_0^2, \ldots, \sigma_{N-1}^2]$$

The MUSIC (MUltiple Signal Classification) method also provides another way of computing a spatial image, with a subspace approach.

The invention also applies in this variant of computing the spatial image $$\Sigma=[\sigma_0^2, \ldots, \sigma_{N-1}^2]$$

which corresponds to the MUSIC pseudo-spectrum computed by diagonalizing the covariance matrix and evaluated for the directions ($\theta_n$, $\varphi_n$).

The spatial image may be computed from a histogram of the intensity vector (1st order), as for example in the article by S. Tervo, Direction estimation based on sound intensity vectors, Proc. EUSIPCO, 2009, or its generalization to a pseudo-intensity vector. In this case, the histogram (whose values are the number of occurrences of direction of arrival values in the predetermined directions ($e_n$, $\varphi_n$)) is interpreted as a set of energies in the predetermined directions.

Block 330 then quantizes the spatial image thus determined, for example with a scalar quantization on 16 bits per coefficient (by directly using the floating-point representation truncated on 16 bits). In some variants, other scalar or vector quantization methods are possible.

In another embodiment, the information representative of the spatial image of the original multichannel signal is a covariance matrix (of the sub-bands) of the input channels B. This matrix is computed as:

$C=B.B^T$ to within a normalization factor (in the real case).

If the invention is implemented in a complex-value transformed domain, this covariance is computed as:

$$C=Re(B.B^H)$$

to within a normalization factor.

In some variants, operations of temporally smoothing the covariance matrix may be used. In the cases of a multichannel signal in the time domain, the covariance may be estimated recursively (sample by sample).

With the covariance matrix C (of size K×K) being, by definition, symmetrical, only one of the lower or upper triangles is transmitted to the quantization block 330, which codes (Q) K(K+1)/2 coefficients, K being the number of ambisonic components.

This block 330 quantizes these coefficients, for example with a scalar quantization on 16 bits per coefficient (by directly using the floating-point representation truncated on 16 bits). In some variants, other methods for the scalar or vector quantization of the covariance matrix may be implemented. For example, it is possible to compute the maximum value (maximum variance) of the covariance matrix and then use scalar quantization with a logarithmic step to code, on a smaller number of bits (for example 8 bits), the values of the upper (or lower) triangle of the covariance matrix normalized by its maximum value.

In some variants, the covariance matrix C may be regularized before quantization in the form C+εI.

The quantized values are sent to the multiplexer 340.

In this embodiment, the decoder receives, in the demultiplexer block 350, a bitstream comprising a coded audio signal resulting from the original multichannel signal and the information representative of a spatial image of the original multichannel signal.

Block 360 decodes ($Q^{-1}$) the covariance matrix or other information representative of the spatial image of the original signal. Block 370 decodes (DEC) the audio signal as represented by the bitstream.

In one embodiment of the coding and the decoding, not implementing the downmix and upmix steps, the decoded multichannel signal $\hat{B}$ is obtained at the output of the decoding block 370.

In the embodiment in which the downmix step was used for coding, the decoding implemented in block 370 makes it possible to obtain a decoded audio signal $\hat{B}'$ that is sent to the input of upmix block 371.

Block 371 thus implements an optional step (UPMIX) of increasing the number of channels. In one embodiment of this step, for the channel of a mono signal, it consists in convolving the signal $\hat{B}'$ using various spatial room impulse responses (SRIR); these SRIRs are defined at the original ambisonic order of B. Other decorrelation methods are possible, for example applying all-pass decorrelating filters to the various channels of the signal $\hat{B}'$.

Block 372 implements an optional step (SB) of dividing into sub-bands in order to obtain either sub-bands in the time domain or in a transformed domain. An inverse step, in block 391, groups the sub-bands together in order to recover a multichannel signal at output.

Block 375 determines (Inf $\hat{B}$) information representative of a spatial image of the decoded multichannel signal in a manner similar to what was described for block 321 (for the original multichannel signal), this time applied to the decoded multichannel signal $\hat{B}$ obtained at output of block 371 or block 370 depending on the decoding embodiments.

In the same way as what was described for block 321, in one embodiment, this information is energy information associated with directions from which the sound originates (associated with directions of virtual loudspeakers distributed over a unit sphere). As explained above, an SRP method (or the like) may be used to determine the spatial image of the decoded multichannel signal.

In another embodiment, this information is a covariance matrix of the channels of the decoded multichannel signal. This covariance matrix is then obtained as follows:

$\hat{C}=\hat{B}.\hat{B}^T$ (real case) or $\hat{C}=\mathrm{Re}(\hat{B}.\hat{B}^H)$ (complex case) to within a normalization factor.

In some variants, operations of temporally smoothing the covariance matrix may be used. In the case of a multichannel signal in the time domain, the covariance may be estimated recursively (sample by sample).

From the information representative of the spatial images of the original multichannel signal (Inf. B) and of the decoded multichannel signal (Inf. $\hat{B}$), respectively, for example, the covariance matrices C and $\hat{C}$, block 380 implements the method for determining (Det.Corr) a set of corrections as described with reference to FIG. 2.

Two particular embodiments of this determination are described with reference to FIGS. 4 and 5.

Figure 4:
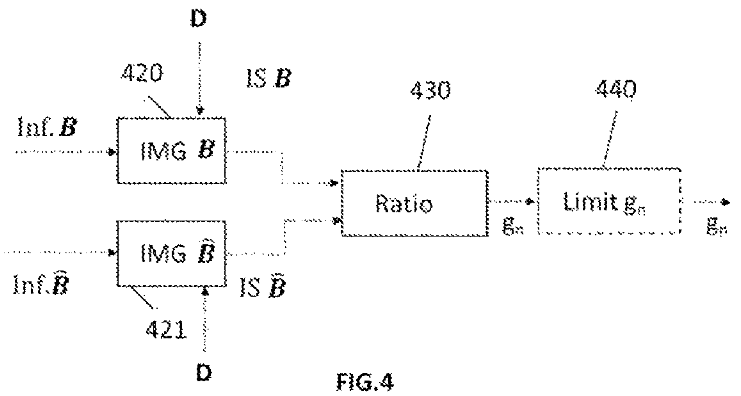
FIG. 4 illustrates a first detailed embodiment of the block for determining the set of corrections.
Figure 5:
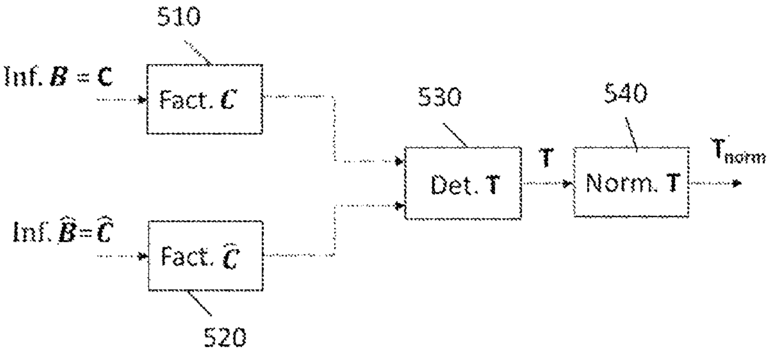
FIG. 5 illustrates a second detailed embodiment of the block for determining the set of corrections.

In the embodiment of FIG. 4, a method using (explicit or non-explicit) rendering on virtual loudspeakers is used and, in the embodiment of FIG. 5, a method implemented based on a Cholesky factorization is used.

Block 390 of FIG. 3 implements a correction (CORR) of the decoded multichannel signal using the set of corrections determined by block 380 in order to obtain a corrected decoded multichannel signal.

FIG. 4 therefore shows one embodiment of the step of determining a set of corrections. This embodiment is performed using rendering on virtual loudspeakers.

In this embodiment, it is considered initially that the information representative of the spatial image of the original multichannel signal and of the decoded multichannel signal are the respective covariance matrices C and $\hat{C}$.

In this case, blocks 420 and 421 respectively determine the spatial images of the original multichannel signal and of the decoded multichannel signal.

For this purpose, as described above, a virtual 3D sphere with a unit radius is discretized by N points ("point" virtual loudspeakers) whose direction is defined in spherical coordinates by the directions $(\theta_n, \varphi_n)$ for the nth loudspeaker.

Multiple discretization methods have been defined above.

From this discretization, it is possible to determine the spatial image of the multichannel signal. As described above, one possible method is the SRP method (or the like), which consists in computing the short-term energy coming from various directions defined in terms of azimuth and elevation.

This method or other types of method as listed above may be used to determine the spatial images Σ and $\hat{\Sigma}$ (IS B and IS $\hat{B}$), respectively, of the original multichannel signal at 420 (IMG B), and of the decoded multichannel signal at 421 (IMG $\hat{B}$).

If the information representative of the spatial image of the original signal (Inf B) received and decoded at 360 by the decoder is the spatial image itself, that is to say energy information (or a positive value) associated with directions from which the sound originates (associated with directions of virtual loudspeakers distributed over a unit sphere), then it is no longer necessary to compute this at 420. This spatial image is then used directly by block 430 described below.

Likewise, if the determination, at 375, of the information representative of the spatial image of the decoded multichannel signal (Inf $\hat{B}$) is the spatial image itself of the decoded multichannel signal, then it is no longer necessary to compute this at 421. This spatial image is then used directly by block 430 described below.

From the spatial images Σ and $\hat{\Sigma}$, block 430 computes (Ratio), for each point given by $(\theta_n, \varphi_n)$, the energy ratio between the energy $\sigma_n^2=\Sigma_n$ of the original signal and the energy $\hat{\sigma}_n^2=\hat{\Sigma}_n$ of the decoded signal. A set of gains $g_n$ is thus obtained using the following equation:

$$g_n = \sqrt{\frac{\sigma_n^2}{\hat{\sigma}_n^2 + \varepsilon}}$$

The energy ratio, depending on the direction ($\theta_n$, $\varphi_n$) and the frequency band, may be very large. Block 440 makes it possible optionally to limit (Limit $g_n$) the maximum value that a gain $g_n$ is able to take. It will be recalled here that the positive values, denoted $\sigma_n^2$ and $\hat{\sigma}_n^2$, may correspond more generally to values resulting from a MUSIC pseudo-spectrum or values resulting from a histogram of directions of arrival in the discretized directions ($\theta_n$, $\varphi_n$).

In one possible embodiment, a threshold is applied to the value of $g_n$. Any value greater than this threshold is forced to be equal to this threshold value. The threshold may for example be set at 6 dB, such that a gain value outside the interval ±6 dB is saturated at ±6 dB.

This set of gains $g_n$ therefore constitutes the set of corrections to be made to the decoded multichannel signal.

This set of gains is received at input of the correction block 390 of FIG. 3.

A correction matrix able to be applied directly to the decoded multichannel signal may be defined, for example in the form $G=E.\text{diag}([g_0 \ldots g_{N-1}]).D$ where D and E are the above-defined acoustic decoding and encoding matrices. This matrix G is applied to the decoded multichannel signal $\hat{B}$ in order to obtain the corrected output ambisonic signal ($\hat{B}$ corr).

A breakdown of the steps implemented for the correction is now described. Block 390 applies, for each virtual loudspeaker, the corresponding previously determined gain $g_n$. Applying this gain makes it possible to obtain, on this loudspeaker, the same energy as the original signal.

The rendering of the decoded signals on each loudspeaker is thus corrected.

An acoustic encoding step, for example ambisonic encoding using the matrix E, is then implemented in order to obtain components of the multichannel signal, for example ambisonic components. These ambisonic components are finally summed in order to obtain the corrected output multichannel signal ($\hat{B}$ Corr). It is therefore possible to explicitly compute the channels associated with the virtual loudspeakers, apply a gain thereto, and then recombine the processed channels, or, in an equivalent manner, apply the matrix G to the signal to be corrected.

In some variants, it is possible, from the covariance matrix $\hat{C}$ of the coded and then decoded multichannel signal and from the correction matrix G, to compute the covariance matrix of the corrected signal in block 390 as:

$$R=G.\hat{C}.G^T$$

Only the value of the first coefficient $R_{00}$ of the matrix R, corresponding to the omnidirectional component (W channel), is retained in order to be applied, as normalization factor, to R and avoid an increase in the overall gain due to the correction matrix G:

$$\hat{B}_{corr}=G_{norm}.\hat{B}$$

$$G_{norm}=g_{norm}.G$$

with $$g_{norm}=\sqrt{\hat{C}_{00}/R_{00}}$$

where $\hat{C}_{00}$ corresponds to the first coefficient of the covariance matrix of the decoded multichannel signal.

In some variants, the normalization factor $g_{norm}$ may be determined without computing the whole matrix R, since it is enough to compute only a subset of matrix elements in order to determine $R_{00}$ (and therefore $g_{norm}$).

The matrix G or $G_{norm}$ thus obtained corresponds to the set of corrections to be made to the decoded multichannel signal.

FIG. 5 now shows another embodiment of the method for determining the set of corrections implemented in block 380 of FIG. 3.

In this embodiment, it is considered that the information representative of the spatial image of the original multichannel signal and of the decoded multichannel signal are the respective covariance matrices C and $\hat{C}$.

In this embodiment, it is not sought to perform rendering on virtual loudspeakers in order to correct the spatial image of a multichannel signal. In particular, for an ambisonic signal, it is sought to compute the correction of the spatial image directly in the ambisonic domain.

For this purpose, a transformation matrix T to be applied to the decoded signal is determined, such that the spatial image modified after applying the transformation matrix T to the decoded signal $\hat{B}$ is the same as that of the original signal B. What is sought is therefore a matrix T that satisfies the following equation: $T.\hat{C}.T^T=C$ where $C=B.B^T$ is the covariance matrix of B and $\hat{C}=\hat{B}.\hat{B}^T$ is the covariance matrix of $\hat{B}$, in the current frame.

In this embodiment, a factorization known as a Cholesky factorization is used to solve this equation.

Given a matrix A of size n×n, the Cholesky factorization consists in determining a (lower or upper) triangular matrix L such that $A=LL^T$ (real case) and $A=LL^H$ (complex case). For the decomposition to be possible, the matrix A should be a positive definite symmetric matrix (real case) or positive definite Hermitian matrix (complex case); in the real case, the diagonal coefficients of L are strictly positive.

In the real case, a matrix M of size n×n is said to be positive definite symmetric if it is symmetric ($M^T=M$) and positive definite ($x^TMx>0$ for any value of $x\in\mathbb{R}^n\backslash\{0\}$).

For a symmetric matrix M, it is possible to verify that the matrix is positive definite if all of its eigenvalues are strictly positive ($\lambda_i>0$). If the eigenvalues are positive ($\lambda_i\geq0$), the matrix is said to be positive semi-definite.

A matrix M of size n×n is said to be positive definite symmetric Hermitian if it is Hermitian ($M^H=M$) and positive definite ($z^HMz$ is a real >0 for any value of $z\in\mathbb{C}^n\backslash\{0\}$).

The Cholesky factorization is for example used to find a solution to a system of linear equations of the type Ax=b. For example, in the complex case, it is possible to transform A into $LL^H$ using the Cholesky factorization, to solve Ly=b and then to solve $L^Hx=y$.

In equivalent fashion, the Cholesky factorization may be written as $A=U^TU$ (real case) and $A=U^HU$ (complex case), where U is an upper triangular matrix.

In the embodiment described here, without loss of generality, only the case of a Cholesky factorization with a triangular matrix L is dealt with.

The Cholesky factorization thus makes it possible to decompose a matrix $C=L.L^T$ into two triangular matrices on the condition that the matrix C is positive definite symmetric. This gives the following equation:

$$T.\hat{L}.\hat{L}^T=L.L^T$$

Identification is used to find:

$$T.\hat{L}=L$$

That is to say:

$$T=L.\hat{L}^{-1}$$

Since the covariance matrices C and $\hat{C}$ are generally positive semi-definite matrices, the Cholesky factorization cannot be used as such.

It will be noted here that, when the matrices L and $\hat{L}$ are lower (respectively upper) triangular, the transformation matrix T is also lower (respectively upper) triangular.

Block 510 thus forces the covariance matrix C to be positive definite. For this purpose, a value ε is added (Fact. C for factorization of C) to the coefficients of the diagonal of the matrix in order to guarantee that the matrix is actually positive definite: C=C+εI, where ε is a low value set for example at $10^{-9}$ and I is the identity matrix.

Similarly, block 520 forces the covariance matrix $\hat{C}$ to be positive definite, by modifying this matrix in the form $\hat{C}=\hat{C}\varepsilon I$, where ε is a low value set for example at $10^{-9}$ and I is the identity matrix.

Once the two covariance matrices C and $\hat{C}$ are conditioned to be positive definite, block 530 computes the associated Cholesky factorizations and finds (Det.T) the optimum transformation matrix T in the form $$T=L.\hat{L}^{-1}.$$

In some variants, an alternative resolution may be performed with decomposition into eigenvalues.

The decomposition into eigenvalues ("eigen decomposition") consists in factorizing a real or complex matrix A of size nxn in the form:

$$A=Q\Lambda Q^{-1}$$

where Λ is a diagonal matrix containing the eigenvalues $\lambda_i$ and Q is the matrix of the eigenvectors.

If the matrix is real:

$$A=Q\Lambda Q^{T}$$

In the complex case, the decomposition is written: $A=Q\Lambda Q^{H}$

In the present case, what is then sought is a matrix T such that: $T.\hat{C}.T^{T}=C$ where $C=Q\Lambda Q^{t}$ and $$\hat{C}=\hat{Q}\hat{\Lambda}\hat{Q}^{t},$$

that is to say:

$$T.\hat{Q}.\hat{\Lambda}.\hat{Q}^{t}.T^{t}=Q\Lambda Q^{t}$$

Identification is used to find:

$$T.\hat{Q}.\sqrt{\hat{\Lambda}}=Q\sqrt{\Lambda}$$

That is to say:

$$T=Q.\sqrt{\Lambda}.\sqrt{\hat{\Lambda}}^{-1}.\hat{Q}^{-1}$$

The stability of the solution from one frame to another is typically not as good as with a Cholesky factorization approach. This instability is exacerbated by more significant computational approximations that are potentially larger during the decomposition into eigenvalues.

In some variants, the diagonal matrix $$\sqrt{\Lambda}.\sqrt{\hat{\Lambda}}^{-1}$$

where $$\Lambda=(\lambda_0, \ldots, \lambda_{K-1}) et \hat{\Lambda}=(\hat{\lambda}_0, \ldots, \hat{\lambda}_{K-1}),$$

may be computed element by element in the form $\mathrm{sgn}(\lambda_i.\hat{\lambda}_i)\sqrt{|\lambda_i|/(|\hat{\lambda}_i|+\varepsilon)}$ where sgn(.) is a sign function (+1 if positive, −1 otherwise) and ε is a regularization term (for example $\varepsilon=10^{-9}$) in order to avoid divisions by zero.

In this embodiment, it is possible for the relative difference in energy between the decoded ambisonic signal and the corrected ambisonic signal to be very large, in particular in terms of high frequencies, which may be strongly deteriorated by encoders such as multi-mono EVS coding. In order to avoid excessively amplifying certain frequency areas, a regularization term may be added. Block 640 optionally takes responsibility for normalizing (Norm. T) this correction.

In the preferred embodiment, a normalization factor is therefore computed so as not to amplify frequency areas.

From the covariance matrix $\hat{C}$ of the coded and then decoded multichannel signal and from the transformation matrix T, it is possible to compute the covariance matrix of the corrected signal as:

$$R=T.\hat{C}.T^{T}$$

Only the value of the first coefficient $R_{00}$ of the matrix R, corresponding to the omnidirectional component (W channel), is retained in order to be applied, as normalization factor, to T and avoid an increase in the overall gain due to the correction matrix T:

$$\hat{B}_{corr}=T_{norm}.\hat{B}$$

$$T_{norm}=g_{norm}.T$$

with $$g_{norm}=\sqrt{\hat{C}_{00}/R_{00}}$$

where $\hat{C}_{00}$ corresponds to the first coefficient of the covariance matrix of the decoded multichannel signal.

In some variants, the normalization factor $g_{norm}$ may be determined without computing the whole matrix R, since it is enough to compute only a subset of matrix elements in order to determine $R_{00}$ (and therefore $g_{norm}$).

The matrix T or $T_{norm}$ thus obtained corresponds to the set of corrections to be made to the decoded multichannel signal.

With this embodiment, block 390 of FIG. 3 performs the step of correcting the decoded multichannel signal by applying the transformation matrix T or $T_{norm}$ directly to the decoded multichannel signal, in the ambisonic domain, in order to obtain the corrected output ambisonic signal ($\hat{B}$ corr).

Figure 6:
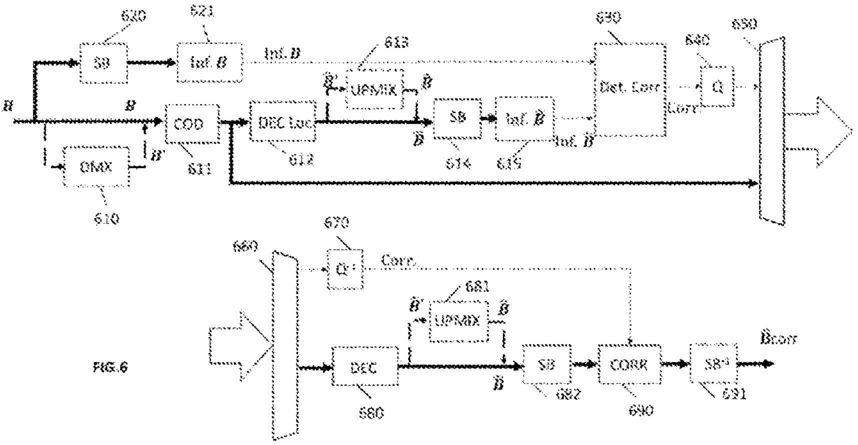
FIG. 6 illustrates a second embodiment of an encoder and a decoder, a coding method and a decoding method according to the invention.

A second embodiment of an encoder/decoder according to the invention will now be described, in which the method for determining the set of corrections is implemented at the encoder. FIG. 6 describes this embodiment. This figure therefore shows a second embodiment of a coding device and of a decoding device for implementing a coding and decoding method including a method for determining a set of corrections as described with reference to FIG. 2.

In this embodiment, the method for determining the set of corrections (for example gains associated with directions) is performed at the encoder, which then transmits this set of corrections to the decoder. The decoder decodes this set of corrections in order to apply it to the decoded multichannel signal. This embodiment therefore involves implementing local decoding at the encoder, and this local decoding is represented by blocks 612 to 613.

Blocks 610, 611, 620 and 621 are identical, respectively, to blocks 310, 311, 320 and 321 described with reference to FIG. 3.

Information representative of the spatial image of the original multichannel signal (Inf. B) is thus obtained at the output of block 621.

Block 612 implements local decoding (DEC_loc) in line with the coding performed by block 611.

This local decoding may consist of complete decoding from the bitstream from block 611 or, preferably, it may be integrated into block 611.

In one embodiment of the coding and decoding, not implementing the downmix and upmix steps, the decoded multichannel signal $\hat{B}$ is obtained at the output of the local decoding block 612.

In the embodiment in which the downmix step at 610 was used for coding, the local decoding implemented in block 612 makes it possible to obtain a decoded audio signal $\hat{B}'$ that is sent to the input of upmix block 613.

Block 613 thus implements an optional step (UPMIX) of increasing the number of channels. In one embodiment of this step, for the channel of a mono signal $\hat{B}'$, it consists in convolving the signal $\hat{B}'$ using various spatial room impulse responses (SRIR); these SRIRs are defined at the original ambisonic order of B. Other decorrelation methods are possible, for example applying all-pass decorrelating filters to the various channels of the signal $\hat{B}'$.

Block 614 implements an optional step (SB) of dividing into sub-bands in order to obtain either sub-bands in the time domain or in a transformed domain.

Block 615 determines (Inf $\hat{B}$) information representative of a spatial image of the decoded multichannel signal in a manner similar to what was described for blocks 621 and 321 (for the original multichannel signal), this time applied to the decoded multichannel signal $\hat{B}$ obtained at output of block 612 or block 613 depending on the embodiments of the local decoding. This block 615 is equivalent to block 375 in FIG. 3.

In the same way as for blocks 621 and 321, in one embodiment, this information is energy information associated with directions from which the sound originates (associated with directions of virtual loudspeakers distributed over a unit sphere). As explained above, an SRP method or the like (like the variants described above) may be used to determine the spatial image of the decoded multichannel signal.

In another embodiment, this information is a covariance matrix of the channels of the decoded multichannel signal.

This covariance matrix is then obtained as follows:

$\hat{C}=\hat{B}.\hat{B}^T$ to within a normalization factor (in the real case)

or $\hat{C}=\mathrm{Re}(\hat{B}.\hat{B}^H)$ to within a normalization factor (in the complex case)

From the information representative of the spatial images of the original multichannel signal (Inf. B) and of the decoded multichannel signal (Inf. $\hat{B}$), respectively, for example, the covariance matrices C and $\hat{C}$, block 680 implements the method for determining (Det.Corr) a set of corrections as described with reference to FIG. 2.

Two particular embodiments of this determination are possible and have been described with reference to FIGS. 4 and 5.

In the embodiment of FIG. 4, a method using rendering on loudspeakers is used and, in the embodiment of FIG. 5, a method implemented directly in the ambisonic domain and based on a Cholesky factorization or by decomposition into eigenvalues is used.

Thus, if the embodiment of FIG. 4 is applied at 630, the determined set of corrections is a set of gains $g_n$ for a set of directions $(\theta_n, \varphi_n)$ defined by a set of virtual loudspeakers. This set of gains may be determined in the form of a correction matrix G, as described with reference to FIG. 4.

This set of gains (Corr.) is then coded at 640. Coding this set of gains may consist in coding the correction matrix G or $G_{norm}$.

It will be noted that the matrix G of size K×K is symmetrical, thus, according to the invention, it is possible to code only the lower or upper triangle of G or $G_{norm}$, that is to say K×(K+1)/2 values. In general, the values on the diagonal are positive. In one embodiment, the matrix G or $G_{norm}$ is coded using scalar quantization (with or without a sign bit) depending on whether or not the values are off-diagonal. In variants in which $G_{norm}$ is used, it is possible to dispense with coding and transmitting the first value of the diagonal (corresponding to the omnidirectional component) of $G_{norm}$ as it is always at 1; for example, in the 1st-order ambisonic case with K=4 channels, this is tantamount to transmitting only 9 values instead of K×(K+1)/2=10 values. In some variants, other scalar or vector quantization methods (with or without prediction) may be used.

If the embodiment of FIG. 5 is applied at 630, the determined set of corrections is a transformation matrix T or $T_{norm}$, which is then coded at 640.

It will be noted that the matrix T of size K×K is triangular in the variant using Cholesky factorization and symmetric in the variant using eigenvalue decomposition; thus, according to the invention, it is possible to code only the lower or upper triangle of T or $T_{norm}$, i.e. K×(K+1)/2 values.

In general, the values on the diagonal are positive. In one embodiment, the matrix T or $T_{norm}$ is coded using scalar quantization (with or without a sign bit) depending on whether or not the values are off-diagonal. In some variants, other scalar or vector quantization methods (with or without prediction) may be used. In variants in which $T_{norm}$ is used, it is possible to dispense with coding and transmitting the first value of the diagonal (corresponding to the omnidirectional component) of $T_{norm}$ as it is always at 1; for example, in the 1st-order ambisonic case with K=4 channels, this is tantamount to transmitting only 9 values instead of K×(K+1)/2=10 values.

Block 640 thus codes the determined set of corrections and sends the coded set of corrections to the multiplexer 650.

The decoder receives, in the demultiplexer block 660, a bitstream comprising a coded audio signal resulting from the original multichannel signal and the coded set of corrections to be applied to the decoded multichannel signal.

Block 670 decodes ($Q^{-1}$) the coded set of corrections. Block 680 decodes (DEC) the coded audio signal received in the stream.

In one embodiment of the coding and the decoding, not implementing the downmix and upmix steps, the decoded multichannel signal $\hat{B}$ is obtained at the output of the decoding block 680.

In the embodiment in which the downmix step was used for coding, the decoding implemented in block 680 makes it possible to obtain a decoded audio signal that is sent to the input of upmix block 681.

Block 681 thus implements an optional step (UPMIX) of increasing the number of channels. In one embodiment of this step, for the channel of a mono signal $\hat{B}'$, it consists in convolving the signal $\hat{B}'$ using various spatial room impulse responses (SRIR); these SRIRs are defined at the original ambisonic order of B. Other decorrelation methods are possible, for example applying all-pass decorrelating filters to the various channels of the signal $\hat{B}'$.

Block 682 implements an optional step (SB) of dividing into sub-bands in order to obtain either sub-bands in the time domain or in a transformed domain, and block 691 groups the sub-bands together in order to recover the output multichannel signal.

Block 690 implements a correction (CORR) of the decoded multichannel signal using the set of corrections decoded at block 670 in order to obtain a corrected decoded multichannel signal ($\hat{B}$ Corr).

In one embodiment in which the set of corrections is a set of gains as described with reference to FIG. 4, this set of gains is received at input of correction block 690.

If the set of gains is in the form of a correction matrix able to be applied directly to the decoded multichannel signal, defined for example in the form $G=E.\mathrm{diag}([g_0 \ldots g_{N-1}]).D$ or $G_{norm}=g_{norm}.G$, this matrix G or $G_{norm}$ is then applied to the decoded multichannel signal $\hat{B}$ in order to obtain the corrected output ambisonic signal ($\hat{B}$ Corr).

If block 690 receives a set of gains $g_n$, block 690 applies the corresponding gain $g_n$ for each virtual loudspeaker. Applying this gain makes it possible to obtain, on this loudspeaker, the same energy as the original signal.

The rendering of the decoded signals on each loudspeaker is thus corrected.

An acoustic encoding step, for example ambisonic encoding, is then implemented in order to obtain components of the multichannel signal, for example ambisonic components. These ambisonic components are then summed in order to obtain the corrected multichannel output signal ($\hat{B}$ Corr).

In one embodiment in which the set of corrections is a transformation matrix as described with reference to FIG. 5, the transformation matrix T decoded at 670 is received at input of correction block 690.

With this embodiment, block 690 performs the step of correcting the decoded multichannel signal by applying the transformation matrix T or $T_{norm}$ directly to the decoded multichannel signal, in the ambisonic domain, in order to obtain the corrected output ambisonic signal ($\hat{B}$ corr).

Even though the invention applies to the ambisonic case, in some variants, it is possible to convert other formats (multichannel, object, etc.) into ambisonic in order to apply the methods implemented according to the various embodiments described. One exemplary embodiment of such a conversion from a multichannel or object format to an ambisonic format is described in FIG. 2 of the 3GPP TS 26.259 specification (v15.0.0).

Figure 7:
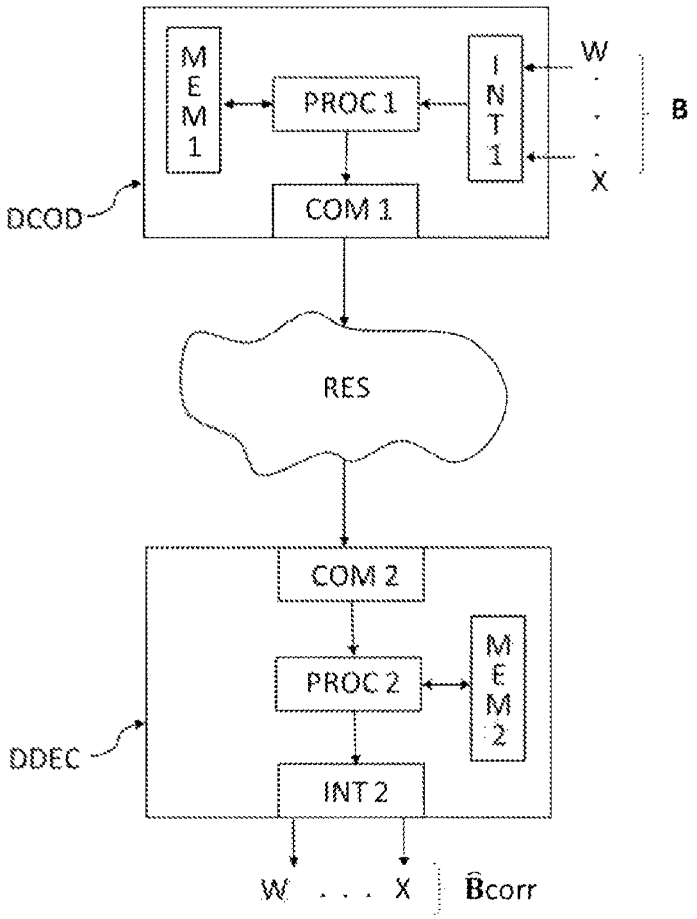
FIG. 7 illustrates examples of a structural embodiment of an encoder and a decoder according to one embodiment of the invention.

FIG. 7 illustrates a coding device DCOD and a decoding device DDEC, within the sense of the invention, these devices being dual to each other (in the sense of "reversible") and connected to one another by a communication network RES.

The coding device DCOD comprises a processing circuit typically including:

- a memory MEM1 for storing instruction data of a computer program within the sense of the invention (these instructions possibly being distributed between the encoder DCOD and the decoder DDEC);
- an interface INT1 for receiving an original multichannel signal B, for example an ambisonic signal distributed over various channels (for example four 1st-order channels W, Y, Z, X) with a view to compression-coding it within the sense of the invention;
- a processor PROC1 for receiving this signal and processing it by executing the computer program instructions stored in the memory MEM1, with a view to coding it; and
- a communication interface COM 1 for transmitting the coded signals via the network.

The decoding device DDEC comprises its own processing circuit, typically including:

- a memory MEM2 for storing instruction data of a computer program within the sense of the invention (these instructions possibly being distributed between the encoder DCOD and the decoder DDEC, as indicated above);
- an interface COM2 for receiving the coded signals from the network RES with a view to compression-decoding them within the sense of the invention;
- a processor PROC2 for processing these signals by executing the computer program instructions stored in the memory MEM2, with a view to decoding them; and
- an output interface INT2 for delivering the corrected decoded signals ($\hat{B}$ Corr), for example in the form of ambisonic channels W . . . X, with a view to rendering them.

Of course, this FIG. 7 illustrates one example of a structural embodiment of a codec (encoder or decoder) within the sense of the invention. FIGS. 3 to 6, commented on above, describe more functional embodiments of these codecs in detail.

Although the present disclosure has been described with reference to one or more examples, workers skilled in the art will recognize that changes may be made in form and detail without departing from the scope of the disclosure and/or the appended claims.

The invention claimed is:

1. A method implemented by a processing circuit of a device and comprising:

determining a set of corrections to be made to a multichannel sound signal, wherein the set of corrections is determined from information representative of a spatial image of an original multichannel signal and from information representative of a spatial image of a decoded multichannel signal that is representative of the original multichannel signal having been coded and then decoded.

2. The method as claimed in claim 1, wherein the set of corrections is determined by frequency sub-band.

3. A method for decoding a multichannel sound signal, the method being implemented by a decoding device and comprising:

receiving a bitstream comprising a coded audio signal from an original multichannel signal and information representative of a spatial image of the original multichannel signal;

decoding the received coded audio signal and obtaining a decoded multichannel signal;

decoding the information representative of the spatial image of the original multichannel signal;

determining information representative of a spatial image of the decoded multichannel signal;

determining a set of corrections to be made to the decoded signal from the information representative of the spatial image of the original multichannel signal and from the information representative of the spatial image of the decoded multichannel signal;

correcting the decoded multichannel signal using the determined set of corrections.

4. A method comprising:

coding a multichannel sound signal, the coding being implemented by a coding device and comprising:

coding an audio signal from an original multichannel signal;

determining information representative of a spatial image of the original multichannel signal;

locally decoding the coded audio signal and obtaining a decoded multichannel signal;

determining information representative of a spatial image of the decoded multichannel signal;

determining a set of corrections to be made to the decoded multichannel signal from the information representative of the spatial image of the original multichannel signal and from the information representative of the spatial image of the decoded multichannel signal; and coding the determined set of corrections.

5. The decoding method as claimed in claim 3, wherein the information representative of a spatial image comprises a covariance matrix, and determining the set of corrections furthermore comprises:

obtaining a weighting matrix comprising weighting vectors associated with a set of virtual loudspeakers;

determining the spatial image of the original multichannel signal from the obtained weighting matrix and from the covariance matrix of the original multichannel signal;

determining the spatial image of the decoded multichannel signal from the obtained weighting matrix and from the covariance matrix of the determined decoded multichannel signal; and computing a ratio between the spatial image of the original multichannel signal and the spatial image of the decoded multichannel signal in the directions of the loudspeakers of the set of virtual loudspeakers, in order to obtain a set of gains.

6. The decoding method as claimed in claim 3, wherein the received information representative of the spatial image of the original multichannel signal is the spatial image of the original multichannel signal, and determining the set of corrections furthermore comprises:

obtaining a weighting matrix comprising weighting vectors associated with a set of virtual loudspeakers;

determining the spatial image of the decoded multichannel signal from the obtained weighting matrix and from the information representative of the spatial image of the determined decoded multichannel signal;

computing a ratio between the spatial image of the original multichannel signal and the spatial image of the decoded multichannel signal in the directions of the loudspeakers of the set of virtual loudspeakers, in order to obtain a set of gains.

7. The decoding method as claimed in claim 3, wherein the information representative of the spatial image of the original multichannel signal and the information representative of the spatial image of the decoded multichannel signal are covariance matrices, and determining the set of corrections comprises determining a transformation matrix through matrix decomposition of the covariance matrices, the transformation matrix constituting the set of corrections.

8. The decoding method as claimed in claim 3, wherein the decoded multichannel signal is corrected by the determined set of corrections by applying the set of corrections to the decoded multichannel signal.

9. The decoding method as claimed in claim 5, wherein the decoded multichannel signal is corrected by the determined set of corrections by:

acoustically decoding the decoded multichannel signal on the defined set of virtual loudspeakers;

applying the obtained set of gains to the signals resulting from the acoustic decoding;

acoustically coding the corrected signals resulting from the acoustic decoding in order to obtain components of the multichannel signal;

summing the components of the multichannel signal thus obtained in order to obtain a corrected multichannel signal.

10. The method as claimed in claim 4, comprising:

decoding the multichannel sound signal by a decoding device, which comprises:

receiving a bitstream comprising the coded audio signal and the coded set of corrections;

decoding the received coded audio signal and obtaining a further decoded multichannel signal;

decoding the coded set of corrections;

correcting the further decoded multichannel signal by applying the decoded set of corrections to the further decoded multichannel signal.

11. The method as claimed in claim 4, comprising:

decoding the multichannel sound signal by a decoding device, which comprises:

receiving a bitstream comprising the coded audio signal from and the coded set of corrections;

decoding the received coded audio signal and obtaining a further decoded multichannel signal;

decoding the coded set of corrections, wherein the coded set of corrections comprises a coded set of gains;

correcting the further decoded multichannel signal using the decoded set of corrections in the following steps:

acoustically decoding the further decoded multichannel signal on a set of virtual loudspeakers;

applying the decoded set of gains to signals resulting from the acoustic decoding to produce corrected signals;

acoustically coding the corrected signals in order to obtain components of the multichannel signal;

summing the components of the multichannel signal thus obtained in order to obtain a corrected multichannel signal.

12. A decoding device comprising:

a processing circuit configured to decode a multichannel sound signal by:

receiving a bitstream comprising a coded audio signal from an original multichannel signal and information representative of a spatial image of the original multichannel signal;

decoding the received coded audio signal and obtaining a decoded multichannel signal;

decoding the information representative of a spatial image of the original multichannel signal;

determining information representative of a spatial image of the decoded multichannel signal;

determining a set of corrections to be made to the decoded signal from the information representative of the spatial image of the original multichannel signal and from the information representative of the spatial image of the decoded multichannel signal;

correcting the decoded multichannel signal using the determined set of corrections.

13. A coding device comprising:

a processing circuit configured to code a multichannel sound signal by:

coding an audio signal from an original multichannel signal;

determining information representative of a spatial image of the original multichannel signal;

locally decoding the coded audio signal and obtaining a decoded multichannel signal;

determining information representative of a spatial image of the decoded multichannel signal;

determining a set of corrections to be made to the decoded multichannel signal from the information representative of the spatial image of the original multichannel signal and from the information representative of the spatial image of the decoded multichannel signal;

coding the determined set of corrections.

14. A non-transitory computer-readable storage medium storing a computer program comprising instructions for executing a method for decoding a multichannel sound signal when the instructions are executed by a processing circuit of a decoding device, wherein the method comprises:

receiving a bitstream comprising a coded audio signal from an original multichannel signal and information representative of a spatial image of the original multichannel signal;

decoding the received coded audio signal and obtaining a decoded multichannel signal;

decoding the information representative of the spatial image of the original multichannel signal;

determining information representative of a spatial image of the decoded multichannel signal;

determining a set of corrections to be made to the decoded signal from the information representative of the spatial image of the original multichannel signal and from the information representative of the spatial image of the decoded multichannel signal; and correcting the decoded multichannel signal using the determined set of corrections.

15. A non-transitory computer-readable storage medium storing a computer program comprising instructions for executing a method for coding a multichannel sound signal when the instructions are executed by a processing circuit of a coding device, wherein the method comprises:

coding an audio signal from an original multichannel signal;

determining information representative of a spatial image of the original multichannel signal;

locally decoding the coded audio signal and obtaining a decoded multichannel signal;

determining information representative of a spatial image of the decoded multichannel signal;

determining a set of corrections to be made to the decoded multichannel signal from the information representative of the spatial image of the original multichannel signal and from the information representative of the spatial image of the decoded multichannel signal; and coding the determined set of corrections.

16. The method as claimed in claim 4, wherein the information representative of a spatial image comprises a covariance matrix, and determining the set of corrections furthermore comprises:

obtaining a weighting matrix comprising weighting vectors associated with a set of virtual loudspeakers;

determining the spatial image of the original multichannel signal from the obtained weighting matrix and from the covariance matrix of the original multichannel signal;

determining the spatial image of the decoded multichannel signal from the obtained weighting matrix and from the covariance matrix of the determined decoded multichannel signal; and computing a ratio between the spatial image of the original multichannel signal and the spatial image of the decoded multichannel signal in the directions of the loudspeakers of the set of virtual loudspeakers, in order to obtain a set of gains.

17. The method as claimed in claim 4, wherein the information representative of the spatial image of the original multichannel signal and the information representative of the spatial image of the decoded multichannel signal are covariance matrices, and determining the set of corrections comprises determining a transformation matrix through matrix decomposition of the covariance matrices, the transformation matrix constituting the set of corrections.

* * * * *